United States Patent
Durgin

(10) Patent No.: US 7,433,652 B2
(45) Date of Patent: Oct. 7, 2008

(54) ELECTRO-MAGNETIC PROPAGATION MODELING

(75) Inventor: Gregory D. Durgin, Atlanta, GA (US)

(73) Assignee: Polaris Wireless, Inc., Santa Clara, CA (US)

( * ) Notice: Subject to any disclaimer, the term of this patent is extended or adjusted under 35 U.S.C. 154(b) by 495 days.

(21) Appl. No.: 11/074,376

(22) Filed: Mar. 7, 2005

(65) Prior Publication Data

US 2006/0199546 A1    Sep. 7, 2006

(51) Int. Cl.
  *H04B 17/00*    (2006.01)
(52) U.S. Cl. .............. 455/67.11; 455/67.14; 455/67.16; 455/456.1; 455/456.2; 342/451; 342/456; 342/463; 342/465
(58) Field of Classification Search .............. 455/67.11, 455/67.14, 67.16, 456.1, 456.2, 456.5; 342/451, 342/456, 463, 465
See application file for complete search history.

(56) References Cited

U.S. PATENT DOCUMENTS

| | | | |
|---|---|---|---|
| 2003/0043073 A1 | 3/2003 | Gray et al. | |
| 2005/0285792 A1* | 12/2005 | Sugar et al. | 342/465 |
| 2005/0286458 A1* | 12/2005 | Furukawa et al. | 370/315 |

FOREIGN PATENT DOCUMENTS

WO    WO 00/50918    8/2000

OTHER PUBLICATIONS

S. Aguirre et al., "Radio Propagation Into Buildings at 912, 1920, and 5990 MHz Using Microcells," Proc. 3rd IEEE ICUPC, Oct. 1994, pp. 129-134.
A. Davidson et al., "Measurement of Building Penetration Into Medium Buildings at 900 and 1500 MHz," IEEE Trans. Vehicular Tech. vol. 46, No. 1, Feb. 1997.
G. Durgin et al., "Measurements and Models for Radio Path Loss and Penetration Loss in and Around Homes and Trees at 5.85 GHz," IEEE Trans. Comm. vol. 46, No. 11, Nov. 1998.

* cited by examiner

*Primary Examiner*—Tuan A Pham
(74) *Attorney, Agent, or Firm*—DeMont & Breyer LLC

(57) ABSTRACT

A generalized framework is disclosed in which a wide variety of propagation models can be cast in a matrix-based format using arbitrary matrix coefficients. Casting propagation models in the matrix-based framework enables efficient computer implementation and calculation, ease of tuning, admissibility, and aggregating multiple propagation models into a single matrix-based model. Matrix-based propagation models based on transmitter-receiver azimuth orientation, transmitter antenna height, terrain elevation, and clutter are also disclosed. The propagation models can be used in conjunction with automated data acquisition from information sources such as topographic maps, clutter maps, etc.

15 Claims, 7 Drawing Sheets

ELECTRO-MAGNETIC PROPAGATION MODELING

FIELD OF THE INVENTION

The present invention relates to telecommunications in general, and, more particularly, to techniques for modeling the electro-magnetic path-loss in an environment.

BACKGROUND OF THE INVENTION

FIG. 1 depicts a schematic diagram of wireless telecommunications system 100 which provides wireless telecommunications service to wireless terminal 101 within a region. The heart of the telecommunications system is wireless switching center 111, which might also be known as a mobile switching center ("MSC") or a mobile telephone switching office ("MTSO").

Typically, wireless switching center 111 is connected to a plurality of base stations (e.g., base stations 102-1, 102-2, and 102-3), which are dispersed throughout the geographic area serviced by the system. As depicted in FIG. 1, base station 102-2 serves wireless terminal 101.

As is well known to those skilled in the art, wireless switching center 111 is responsible for, among other things, establishing and maintaining calls between wireless terminals and between a wireless terminal and a wireline terminal (which is connected to the system via the local and/or long-distance telephone networks).

A base station and a wireless terminal served by the based station communicate via radio-frequency (which is also called "RF") signals. As is well known to those skilled in the art, a signal's strength attenuates as it travels along the path from the transmitter to a receiver. The factors that cause the loss in signal strength include (i) the distance of the signal's path, and (ii) presence of radio-frequency obstacles (e.g., hills, trees, and buildings, etc.) in the signal's path and (iii) off-path scatterers." The amount of loss or attenuation of a signal's strength along its path is known as "path loss."

Because the distance from a transmitter to most locations is different, and in most places the quantity and quality of the radio-frequency obstacles is different in every direction and at different distances from the transmitter, the path loss from the transmitter to most locations varies. Because the path loss from the transmitted to most locations varies, the strength of a transmitted signal at most locations varies as well. For this reason, the path loss and the strength of a received signal are related to each other. In other words, as the path loss increases, the received signal's strength decreases, and as the path loss decreases, the received signal strength increases.

As is well-known to those skilled in the art, the location of a wireless terminal can be estimated by comparing the strength of a received signal at the wireless terminal against a map that correlates signal strength to location. A map that correlates received signal strength to location is known as a "path-loss map."

There are two ways to generate a path-loss map. In accordance with the first way, a test of the signal's strength is empirically measured at every location on the map. Although this provides an accurate map, it is usually prohibitively expensive because there are often a large number of locations at which measurements need to be taken.

In accordance with a second way, a test of the signal's strength is empirically measured at some locations and then the signal strength at the other locations is predicted using interpolation and extrapolation. When the techniques for interpolation and extrapolation are well-chosen, this can provide an economically-reasonable and accurate path-loss map.

The production and updating of path-loss maps has historically been difficult and expensive, and path-loss maps are often inaccurate at specific locations. In fact, some industrial path-loss maps are off as much as 15 to 20 dB at specific locations, which effectively eliminates their usefulness in estimating the location of a wireless terminal based on signal-strength measurements.

Although linear interpolation and extrapolation can be used, more sophisticated mathematical techniques yield more accurate path-loss maps. In the industry, these mathematical techniques are called "path-loss" or "radio-frequency propagation" models. In general, a path-loss model comprises one or more parameters that are fitted into the empirical signal-strength measurements.

FIG. 2 depicts a flowchart of the salient tasks performed in calibrating an path-loss model for a particular geographic area, in the prior art.

At task 210, a path-loss model is selected.

At task 220, a signal-strength measurement is taken at each of a plurality of locations within the geographic area.

At task 230, the values for the parameters in the path-loss model are fitted based on the measurements received at task 220.

At task 240, the path-loss model outputs the predicted signal-strength at each location to form the path-loss map.

The earliest techniques for predicting path loss for wireless networks, which still persist in current planning tools, were simple statistical models based on transmitter-receiver distance. The Hata model and the COST-231 model (an extension of the Hata model) are two popular examples. It is not unusual, however, for these models to produce errors of predicted versus empirical measurements of 10 to 20 dB.

Transmitter-receiver distance models, such as the Hata and COST-231 models, are typically based on the following equations:

$$RSSI_{dBm} = P_{T,dBm} + G_T + G_R - PL(d_{ref}) - PathLoss \quad \text{(Eq. 1)}$$

and $$PL(d_{ref}) = 20\log_{10}\left(\frac{4\pi d_{ref}}{\lambda}\right) \quad \text{(Eq. 2)}$$

wherein:

$RSSI_{dBm}$=Received power (Received Signal Strength Indication);

$P_{T,dBm}$=Transmitted power (power into the transmitter antenna);

$G_T$=Gain, in dB, of the transmitter antenna;

$G_R$=Gain, in dB, of the receiver antenna;

$d_{ref}$=reference distance (usually 10 m in this work);

$\lambda$=freespace wavelength of radiation;

$PL(d_{ref})$=reference path loss; and

PathLoss=Path loss (in dB) with respect to $d_{ref}$ meter, freespace loss.

The PathLoss term depends on receiver location within the propagation environment and contains all of the random variability. The other terms represent effects in the amplifier chain that, once the carrier frequency is known, are constant.

Equation 1 can alternatively be expressed in terms of effective isotropic radiated power (EIRP), which is the sum of the power into the transmitted antenna ($P_{T,dBm}$) and the transmitter antenna gain ($G_T$):

$$RSSI_{dBm} = EIRP_{dBm} + G_R - PL(d_{ref}) - PathLoss \quad \text{(Eq. 3)}$$

Equation 3 is often more useful in practice than Equation 1 because many cellular carriers report EIRP, but do not report one or both of the input transmitter power and the antenna gain.

Another technique for characterizing path loss as a function of transmitter-receiver (TR) separation distance uses path loss exponents. In accordance with this technique, the average dB path loss with respect to 1 m free space is assumed to increase linearly as a function of the logarithm of the distance between the transmitter and the receiver. The slope of this increase is characterized by the path loss exponent, n, in Equation 4:

$$PathLoss = 10n\log_{10}\left(\frac{d}{d_{ref}}\right) \quad \text{(Eq. 4)}$$

where d is the distance between the transmitter and the receiver in meters and $d_{ref}$ is 1 meter, which is a common reference distance. When radios are operating in free space, the path loss exponent is n=2. When radios are operating near the ground, the path loss exponent is almost always greater than 2.

When a number of path-loss measurements (also known as attenuation measurements) have been taken in an environment, well-known regression techniques (e.g., the minimum mean-squared error regression technique, etc.) can be applied to the measurements to calculate the path loss exponent. When there are N measured locations and $PL_i$ denotes the $i^{th}$ path-loss measurement at a distance between the transmitter and the receiver of $d_i$, the value for n is given by Equation 5.

$$n = \frac{\sum_{i=1}^{N} PL_i \log_{10}\left(\frac{d_i}{1m}\right)}{10 \sum_{i=1}^{N} \left[\log_{10}\left(\frac{d_i}{1m}\right)\right]^2} \quad \text{(Eq. 5)}$$

An estimate of the standard deviation, σ, for the measured versus predicted path loss based on this data is given by:

$$\sigma^2 = \frac{1}{N} \sum_{i=1}^{N} \left[PL_i - 10n\log_{10}\left(\frac{d_i}{1m}\right)\right]^2 \quad \text{(Eq. 6)}$$

In general, the path loss experienced by a wireless receiver in the field will be random. Equations 5 and 6 estimate the log-normal statistics of large scale path loss. The log-normal distribution provides a convenient, "best-fit" description for large-scale path loss. For given propagation conditions, such as fixed transmitter-receiver separation distance, a histogram of dB path-loss measurements will assume a Gaussian shape characterized by a mean or average dB value μ, and a standard deviation σ. The value σ represents an approximate two-thirds confidence interval about the dB mean that is predicted by the path loss exponent. The value μ is the path loss calculated from the path loss exponent model. The path loss exponent n that minimizes the standard deviation is useful for gaining quick insight into the general propagation; however, this technique often leads to large, unacceptable standard deviations for prediction at specific locations.

In the 1990s there was a big push in the research community to develop ray tracing techniques for propagation prediction, particularly because the industry was anticipating the proliferation of wireless base stations and prior statistical models, as described above, were ill-suited for the proliferation of wireless base stations. Ray-tracing uses geometrical optics to trace the likely paths of radio waves that reflect and diffract through a digital representation of a cityscape with terrain features. This deterministic approach appealed to many engineers, who expected substantial improvements in model accuracy.

Practitioners of ray-tracing found, however, that while the technique afforded a little more accuracy than prior approaches, it suffered from huge computational costs. Moreover, ray tracing is not a very convenient or scalable technology: engineers often had to spend inordinate amounts of time formatting the maps and data required as inputs to a ray-tracing software engine. In response to these drawbacks, some compromise techniques were developed that employed a balance of additional site data without the complexity and inconvenience of ray-tracing. This class of propagation models, initially developed for indoor usage, was based on basic information such as building blueprints and typically resulted in standard deviation errors of 5-10 dB.

Some path-loss models that use site-specific information can, with a little creativity, be linearized and cast into a matrix format. The linear matrix format is particularly useful because it lends itself to computer evaluation and it can be easily tuned against a set of measurements. As a result, the propagation models become more accurate as more measurements are accumulated.

Matrix-based propagation models have been used in conjunction with computer-generated floor plans to model partition-dependent attenuation factors. These models employ a path loss exponent of n with additional path loss based on the type and number of objects (e.g., interior walls, etc.) between the transmitter and receiver locations. For outdoor-to-indoor propagation environments, these attenuating objects might also include trees, wooded patches, building exteriors, etc. The path loss at any given point is described by Equation 7:

$$PathLoss = 10n\log_{10}\left(\frac{d}{d_{ref}}\right) + a \times x_a + b \times x_b + \cdots \quad \text{(Eq. 7)}$$

wherein a, b, etc. are integers representing the number of radio-frequency obstacles of each type between the receiver and transmitter, and $x_a$, $x_b$, etc. are their respective attenuation values in dB.

For measured data at a known site, the unknowns in Equation 7 are the individual attenuation factors $x_a$, $x_b$, etc. By tuning these model parameters against known measurements, it is possible to extrapolate a more accurate prediction into unmeasured parts of the propagation environment.

One method of calculating attenuation factors $x_a$, $x_b$, etc. is to minimize the mean squared error of measured versus predicted data in dB. If $p_i$ is assigned the path loss measured at the $i^{th}$ location, then N measurements will result in the following system of equations:

$p_1 = 10n \log_{10}(d_1) + a_1 \cdot x_a + b_1 \cdot x_b +$ $p_2 = 10n \log_{10}(d_2) + a_2 \cdot x_a + b_2 \cdot x_b +$ $p_N = 10n \log_{10}(d_N) + a_N \cdot x_a + b_N \cdot x_b +$ (Eq. 8)

As is well-known to those skilled in the art, these N equations can be more elegantly written in matrix notation as:

$$\vec{p} = A\vec{x} \qquad \text{(Eq. 9)}$$

where $$\vec{p} = \begin{bmatrix} p_1 \\ p_2 \\ \vdots \\ p_N \end{bmatrix} \qquad \text{(Eq. 10)}$$

$$\vec{x} = \begin{bmatrix} n \\ x_a \\ x_b \\ \vdots \\ x_z \end{bmatrix} \qquad \text{(Eq. 11)}$$

and $$A = \begin{bmatrix} 10\log_{10}(d_1) & a_1 & b_1 & \cdots & z_1 \\ 10\log_{10}(d_2) & a_2 & b_2 & \cdots & z_2 \\ \vdots & \vdots & \vdots & \ddots & \vdots \\ 10\log_{10}(d_N) & a_N & b_N & \cdots & z_N \end{bmatrix} \qquad \text{(Eq. 12)}$$

If the model is tuned against measurements, the vector $\vec{x}$ is the unknown in Equation 9. As is well-known to those skilled in the art, the components of $\vec{x}$ cannot be solved directly when there are more measured points in $\vec{p}$ than unknowns in $\vec{x}$ because it is an over-determined system of equations. However, by multiplying each side of Equation 9 by the transpose of A, $A^T$, the system of equations can be solved:

$$A^T \vec{p} = A^T A \vec{x} \qquad \text{(Eq. 13)}$$

Equation 13 represents a set of equations called the normal equations. Solving the normal equations for $\vec{x}$ yields the set of parameters that minimizes the mean-squared error.

Despite these advances, path-loss models are still needed that are more accurate, that are more easily tuned, and that more easily lend themselves to computer automation than that depicted in Equation 13.

SUMMARY OF THE INVENTION

The present invention provides a generalized framework in which a wide variety of path-loss models can be cast in a matrix-based format using arbitrary matrix coefficients (e.g., real numbers, integers, etc.) In contrast, prior art matrix-based propagation models were limited to models in which a matrix of cardinal numbers (i.e., non-negative integers) counted the number of obstacles of different classes between a transmitter and a receiver (e.g., trees, buildings, interior walls, etc.).

Furthermore, the framework can be used for modeling any "path trait" (e.g., as bit-error rate, frame-error rate, signal-to-noise ratio, delay, etc.) instead of, or in addition to, path loss. For the purposes of this disclosure, the term "path trait" is defined as a property of an electromagnetic signal that varies along its propagation path. It will be clear to those skilled in the art, after reading this disclosure, how to make and use alternative embodiments of the present invention that pertain to one or more path traits instead of, or in addition to, path loss.

The present invention is predicated on the insight that nearly every type of propagation model can be cast, at least approximately, as a system of linear equations represented by a matrix, and that, consequently, the many advantages of matrix-based models can be extended to a much wider population of propagation models. In particular, matrix-based models have the advantage of efficient computer implementation and calculation, ease of tuning, and admissibility (i.e., the tuned parameters of a linear matrix model are guaranteed to be the global optimum). In addition, the illustrative embodiment of the present invention enables a plurality of propagation models to be aggregated into a single matrix-based model, and enables the tuning of a subset of parameters in such aggregate models.

The illustrative embodiment of the present invention also comprises matrix-based propagation models based on transmitter-receiver azimuth orientation, transmitter antenna height, terrain elevation, clutter, and road orientation. Furthermore, the path-loss models of the illustrative embodiment lend themselves to automated data acquisition from information sources such as topographic maps, road maps, etc.

The illustrative embodiment comprises: (a) receiving a signal-strength measurement for a signal that traverses a path between a first radio and a second radio; (b) generating an estimate of the location of the first radio, wherein the estimate of the location of the first radio is based on:
(i) the signal-strength measurement, and
(ii) a path-loss map that is indicative of the path loss between the location of the second radio and a non-empty set S of locations;
wherein the path-loss map is based on a path-loss model; and wherein the path-loss model is based on a matrix that comprises at least one non-cardinal number.

DETAILED DESCRIPTION

Figure 1:
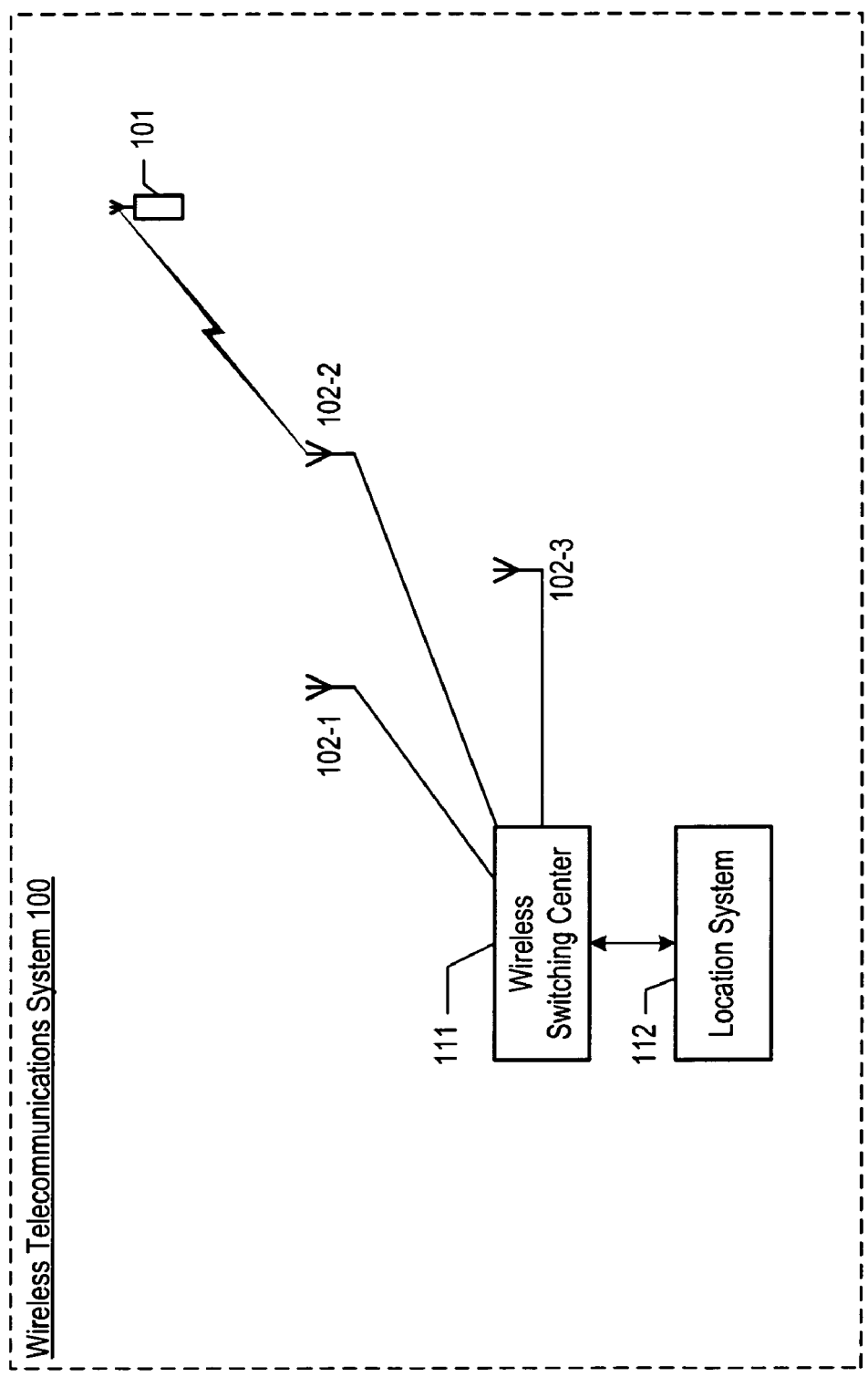
FIG. 1 depicts a wireless telecommunications system in the prior art.
Figure 2:
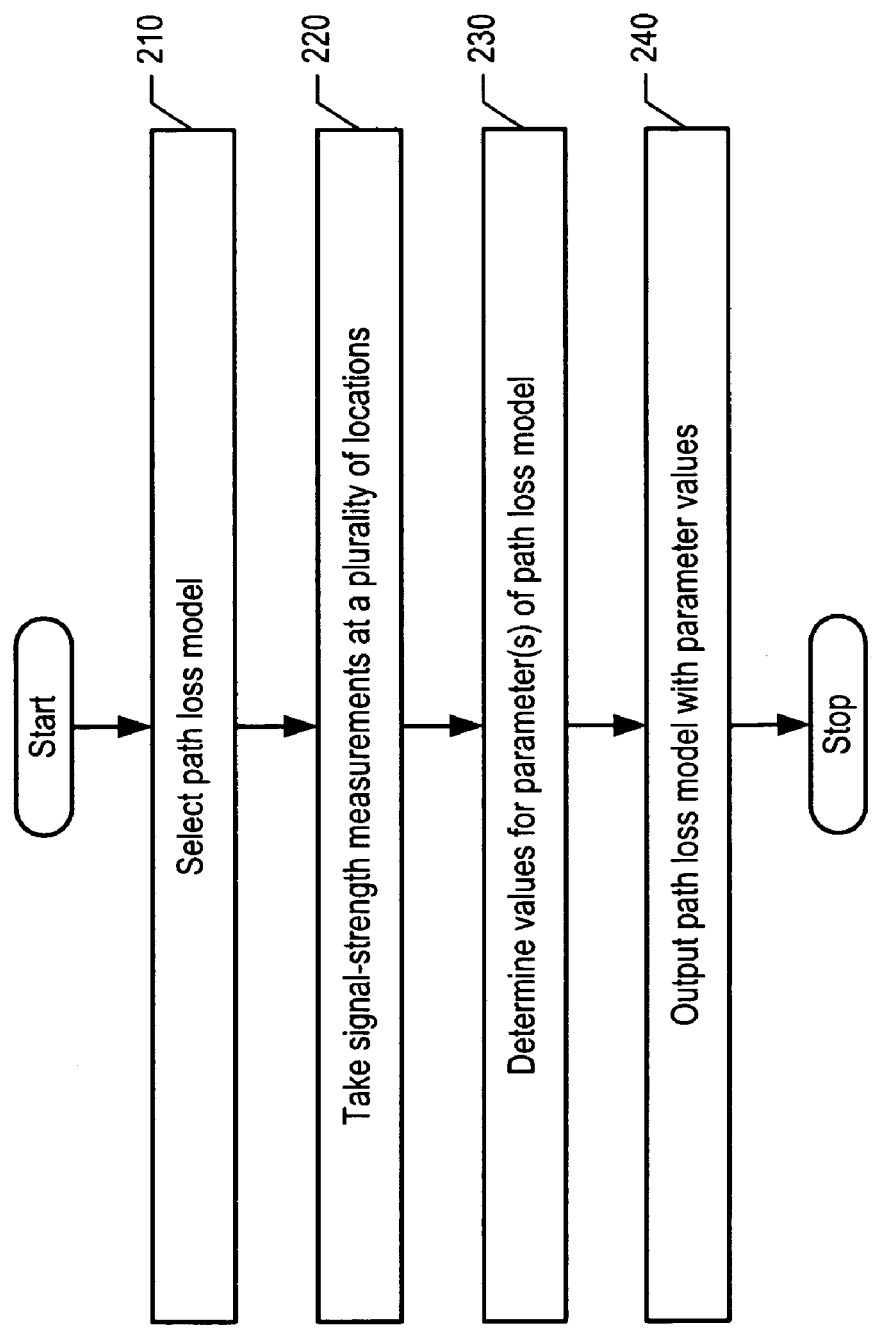
FIG. 2 depicts a flowchart of the salient tasks performed in calibrating an path-loss model for a particular geographic area, in the prior art.
Figure 3:
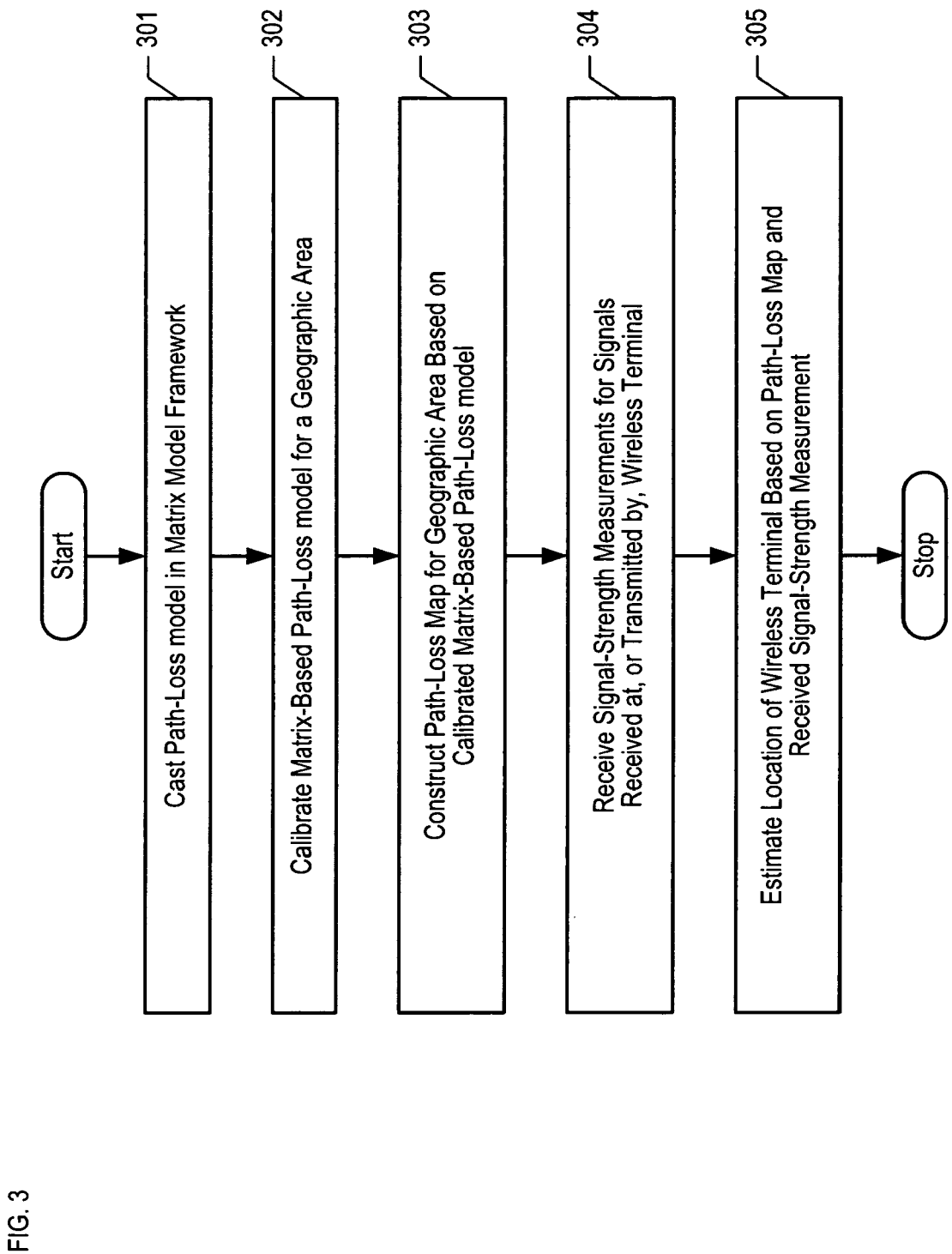
FIG. 3 depicts a flowchart of the salient tasks performed in creating and using an path-loss map in accordance with the illustrative embodiment of the present invention.

FIG. 3 depicts a flowchart of the salient tasks performed in accordance with the illustrative embodiment of the present invention. It will be clear to those skilled in the art, after reading this disclosure, which tasks depicted in FIG. 3 can be performed concurrently or in a different order than that depicted.

At task 301, an path-loss model is cast in the matrix model framework as depicted in Equations 14a and 14b.

$$\begin{bmatrix} p_1 \\ p_2 \\ \vdots \\ p_M \end{bmatrix} = \begin{bmatrix} a_{11} & a_{12} & \cdots & a_{1N} \\ a_{21} & a_{22} & \cdots & a_{2N} \\ \vdots & \vdots & \ddots & \vdots \\ a_{M1} & a_{M2} & \cdots & a_{MN} \end{bmatrix} \begin{bmatrix} x_1 \\ x_2 \\ \vdots \\ x_N \end{bmatrix} \quad \text{(Eq. 14a)}$$

$$\vec{p} = A\vec{x} \quad \text{(Eq. 14b)}$$

Model matrix A comprises coefficients $a_{ij}$, wherein $i \in \{1, 2, \ldots, M\}$ and $j \in \{1, 2, \ldots, N\}$, and wherein coefficients $a_{ij}$ have any type of values (e.g., cardinal numbers, non-integer values, etc.) that are based on a particular propagation model and a particular geographic area. Parameter vector $\vec{x}$ contains tunable parameters of the propagation model, and path-loss vector $\vec{p}$ contains the path-loss measurements or predictions of the propagation model.

Matrix-based propagation models can be constructed from any source of information: a terrain map, a clutter map, building footprints, transmitter-receiver (TR) separation distance, etc. The process of constructing a model matrix consists of two steps. First, numerical information for the model is obtained from an appropriate source; for example, clutter values might be obtained from a large geographical information service (GIS) data file, or azimuth bearings might be calculated from the coordinates of a plurality of receiver locations.

Second, the numerical values obtained in the first step are converted into a matrix format. As will be appreciated by those skilled in the art, there are numerous ways that a particular set of numerical values can be converted into a matrix format. The manner in which a propagation model can be cast in the matrix model framework is described in detail in the section below entitled "Illustrative Propagation Models."

At task 302, the matrix-based path-loss model is calibrated for a particular geographic area. This task is described in detail below and with respect to FIG. 4.

At task 303, an path-loss map for the geographic area is constructed based on the calibrated matrix-based path-loss model. This task is described in detail below and with respect to FIG. 5.

At task 304, a signal-strength measurement is made for the signal that traverses each span between one or more radios at known locations and a wireless terminal. For the purposes of the specification and claims, the term "signal-strength measurement" is defined as a measurement of the strength of a signal associated with a wireless terminal. The signal-strength measurement can be:

i. made by the wireless terminal, or
  ii. of a signal transmitted by the wireless terminal, or
  iii. both i and ii.

In accordance with the illustrative embodiment, the signal-strength measurements are made at the wireless terminal for signals transmitted by wireless base stations. It will be clear to those skilled in the art, however, after reading this disclosure, how to make and use alternative embodiments of the present invention in which some or all of the signal-strength measurements are made at the base stations for a signal transmitted by the wireless terminal.

At task 305, the location of the wireless terminal is estimated based on:

i. the path-loss map constructed at task 303, and
  ii. the signal-strength measurement received at task 304, in well-known fashion. For example, co-filed U.S. patent application Ser. No. 11/080,861, entitled "Estimating the Location of a Wireless Terminal Based on Calibrated Signal-Strength Measurements,", which is incorporated by reference, teaches how to estimate the location of a wireless terminal based on a path-loss map and one or more signal-strength measurements.

Illustrative Propagation Models—This section describes a plurality of matrix-based path-loss models, and illustrates different ways in which an path-loss model can be cast in the matrix model framework (i.e., how task 301 can be performed).

Azimuth-Orientation Model—The azimuth-orientation model captures the effects of azimuth orientation on path loss. Although azimuth effects are primarily due to the radiation patterns of base station transmit antennas, other factors may contribute as well, such as multipath, tower/mounting coupling, terrain, and environmental effects. As will be appreciated by those skilled in the art after reading this disclosure, there are a variety of ways to format the azimuthal bearing angle information into a model matrix. A particularly flexible way is via a cosine harmonic expansion:

$$PathLoss = \sum_{i=1}^{L} c_i \cos(i\theta) + AdditionalPathLoss \quad \text{(Eq. 15)}$$

where $\theta$ is the azimuth bearing angle.

The information source for the azimuth-orientation model is simple: each raster point that requires a path loss value is assigned an azimuthal bearing angle with respect to its serving base station. Thus, only the Universal Transverse Mercator (UTM) coordinates of the base station and the raster point are used in this simple geometrical calculation.

The azimuth values can then be converted into a matrix format using Equation 16:

$$A = \begin{bmatrix} \cos\theta_1 & \cos 2\theta_1 & \cdots & \cos L\theta_1 \\ \cos\theta_2 & \cos 2\theta_2 & \cdots & \cos L\theta_2 \\ \vdots & \vdots & \ddots & \vdots \\ \cos\theta_N & \cos 2\theta_N & \cdots & \cos L\theta_N \end{bmatrix} \vec{x} = \begin{bmatrix} c_1 \\ c_2 \\ c_3 \\ \vdots \\ c_L \end{bmatrix} \quad \text{(Eq. 16)}$$

where angle $\theta_i$ represents the bearing angle of the $i^{th}$ location with respect to base station boresight (the direction in azimuth where the serving cell is pointed), and where model parameters $C_1, C_2, \ldots, C_L$ are the best-fit coefficients of a harmonic cosine expansion that represents an effective antenna pattern. The number L determines how many terms of the cosine series are used. This expansion is very similar to a Fourier series, except that the sine terms are not included; because the model attempts to isolate the antenna effects, the cosines force symmetry about the boresight angle of the antenna.

Antenna-Height Model—In general, as the height of a base station antenna is lowered into the propagation environment, the path loss begins to increase. Radio wave diffraction over the crests of hills, trees, and buildings becomes lossier as the antenna height lowers. The goal of the height model element is to capture this trend, which can take on this general mathematical form:

$$PathLoss = \sum_{i=1}^{L} d_i h^i + AdditionalPathLoss \qquad \text{(Eq. 17)}$$

where h is the above-ground height of the base station transmitter antenna.

Typically a wireless carrier provides a network plan containing base station height in meters. A single value suffices to capture the information required for each sector of a base station.

The model element matrix for height effects is based on a polynomial expansion of $h_i$, the transmitter antenna height of the base station that servers the $i^{th}$ receiver location. A general format for this matrix is:

$$A = \begin{bmatrix} h_1 & h_1^2 & \cdots & h_1^L \\ h_2 & h_2^2 & \cdots & h_2^L \\ \vdots & \vdots & \ddots & \vdots \\ h_N & h_N^2 & \cdots & h_N^L \end{bmatrix} \vec{x} = \begin{bmatrix} d_1 \\ d_2 \\ d_3 \\ \vdots \\ d_L \end{bmatrix} \qquad \text{(Eq. 18)}$$

It is advantageous to normalize the values for $h_i$ by subtracting a reference height value, thereby avoiding large constant offsets with this formulation.

Terrain-Elevation Model—Base stations at higher elevations tend to broadcast effectively stronger signals. Defining terrain difference as the change in elevation from the location of a path-loss measurement to the bottom of the base station tower, a negative terrain difference (i.e., the measured location is lower than the base station terrain) tends to decrease path loss, and a positive terrain difference (i.e., the measured location is higher than the base station terrain) tends to increase path loss. The goal of the terrain-elevation model element is to capture this trend, which can take on this general mathematical form:

$$PathLoss = \sum_{i=1}^{L} g_i t^i + AdditionalPathLoss \qquad \text{(Eq. 19)}$$

where t is the difference between terrain elevation at the transmitter and at the receiver location.

One source of information for the terrain-elevation model is a geo-referenced terrain map. These maps are generated from satellite sweeps and available from a number of computer data companies.

Like the antenna-height model, matrix A for the terrain-elevation model is based on a polynomial expansion of the terrain-height differences:

$$A = \begin{bmatrix} t_1 & t_1^2 & \cdots & t_1^L \\ t_2 & t_2^2 & \cdots & t_2^L \\ \vdots & \vdots & \ddots & \vdots \\ t_N & t_N^2 & \cdots & t_N^L \end{bmatrix} \vec{x} = \begin{bmatrix} g_1 \\ g_2 \\ g_3 \\ \vdots \\ g_L \end{bmatrix} \qquad \text{(Eq. 20)}$$

In some embodiments a simple linear expansion (i.e., L=1) is sufficient because the terrain effect is often relatively weak when modeled in conjunction with diffraction effects.

Clutter Model—Received signal strength indication (RSSI) measured in large open fields tend to be higher than RSSI measured in forested parks, which in turn are higher than RSSI measured in urban canyons. Most of this effect is due to the acuteness of the final "over-the-top" diffraction losses from base station to mobile handset. Clusters of large obstacles—dense buildings in particular—will add an effective path loss offset to every nearby location.

A satellite clutter map best captures the different classes of clutter and obstacles in a given geographic region. In such clutter maps, a location cluster might be classified as "dense urban," "rural," "forest," etc. For a given location z that is within a cluster of type X (e.g., dense urban, etc.), the path loss at location z can be described by:

$$PathLoss = q_0 + q_x + AdditionalPathLoss \qquad \text{(Eq. 21)}$$

where $q_x$ is the path loss associated with type X and $q_0$ is a constant offset that is used to normalize all the $q_x$ so that their average contribution to path loss is 0 dB.

One source of information for the clutter model is a geo-referenced clutter map. These maps, which are generated from satellite imaging, assign location clusters to particular clutter types. Geo-referenced clutter maps are available from a number of computer data companies.

The first column of matrix A for the clutter model has all 1's in the first column, and each subsequent column corresponds to a type of clutter. As in the previous models, each row of matrix A corresponds to a location at which a particular measurement or prediction was made. For each location/row, the column corresponding to the clutter type of that location is assigned a 1, and the columns for all other clutter types are assigned a 0. An example is shown below:

$$A = \begin{bmatrix} 1 & 0 & 0 & 1 & \cdots & 0 \\ 1 & 0 & 1 & 0 & \cdots & 0 \\ 1 & 0 & 0 & 0 & \cdots & 1 \\ 1 & 0 & 0 & 0 & \cdots & 0 \\ \vdots & \vdots & \vdots & \vdots & \ddots & \vdots \\ 1 & 0 & 0 & 1 & \cdots & 0 \end{bmatrix} \vec{x} = \begin{bmatrix} q_0 \\ q_1 \\ q_2 \\ \vdots \\ q_L \end{bmatrix} \qquad \text{(Eq. 22)}$$

Thus, matrix A comprises Boolean (non-cardinal) elements and parameter vector $\vec{x}$ contains all of the clutter offset constants.

Tuning the clutter model requires a little more finesse than the previous models. First, depending on how measurements are sampled in space, it is possible that one or more columns in matrix A are all zeroes. In this case, the aggregate model will become rank deficient and impossible to evaluate. Thus, any zero columns must be purged before a tuning operation.

The constant offset column is also purged before tuning. The optimal clutter type coefficients are calculated from measurements and an average value is calculated from them. This average is then stored in $q_0$ and subtracted from the rest of the coefficients. This bookkeeping method might seem cumbersome, but it makes the relative constant offsets applicable to a universal set of base stations. This normalization distinguishes constant gains and losses in the amplifier chain, which can vary from site to site, from genuine clutter-based path loss trends, which should be common among all sites.

Figure 6:
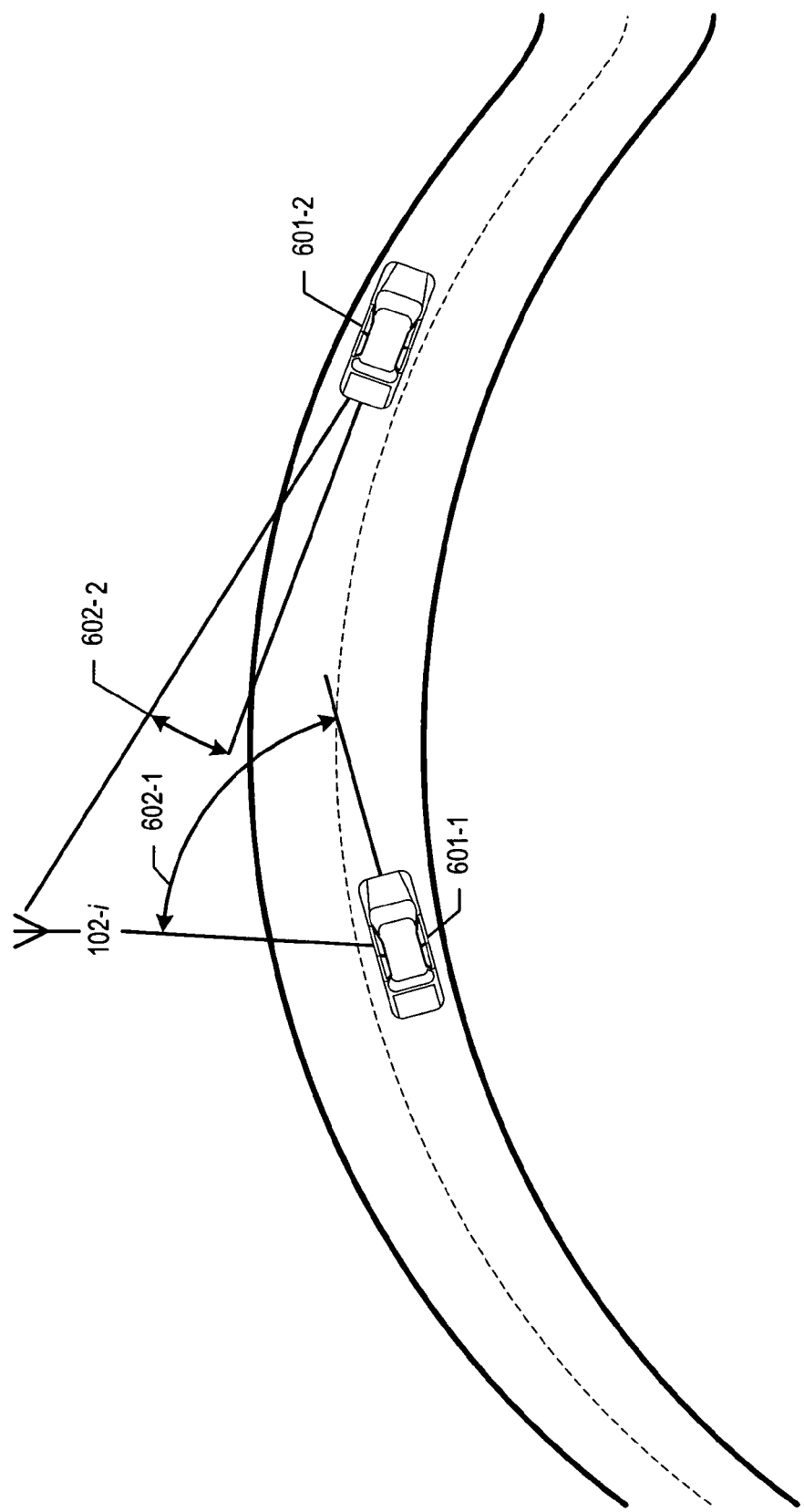
FIG. 6 depicts an illustrative road map for a path-loss model based on road orientation, in accordance with the illustrative embodiment of the present invention.

Road-orientation Model—For a received signal strength indication (RSSI) measured on a road, there is often a strong dependence between signal level and the orientation of the road with respect to the base station bearing. This phenomenon is illustrated in FIG. 6, which depicts base station 102-$i$ and two cars 601-1 and 601-2 riding on an illustrative road. As shown in FIG. 6, angle 602-1, the angle of the road orientation at car 601-1 relative to base station 602-$i$, is larger than angle 602-2, the angle of the road orientation at car 601-2 relative to base station 602-$i$. Due to this larger angle, the location of car 601-1 has statistically greater path loss than the location of car 601-2. The physical mechanism for this is most likely due to minimal diffraction loss at car 601-2. For small angles, the road cuts a swath of open terrain towards the base station, providing near line-of-sight propagation conditions; for large angles, there is no noticeable statistical drop in path loss.

Figure 7:
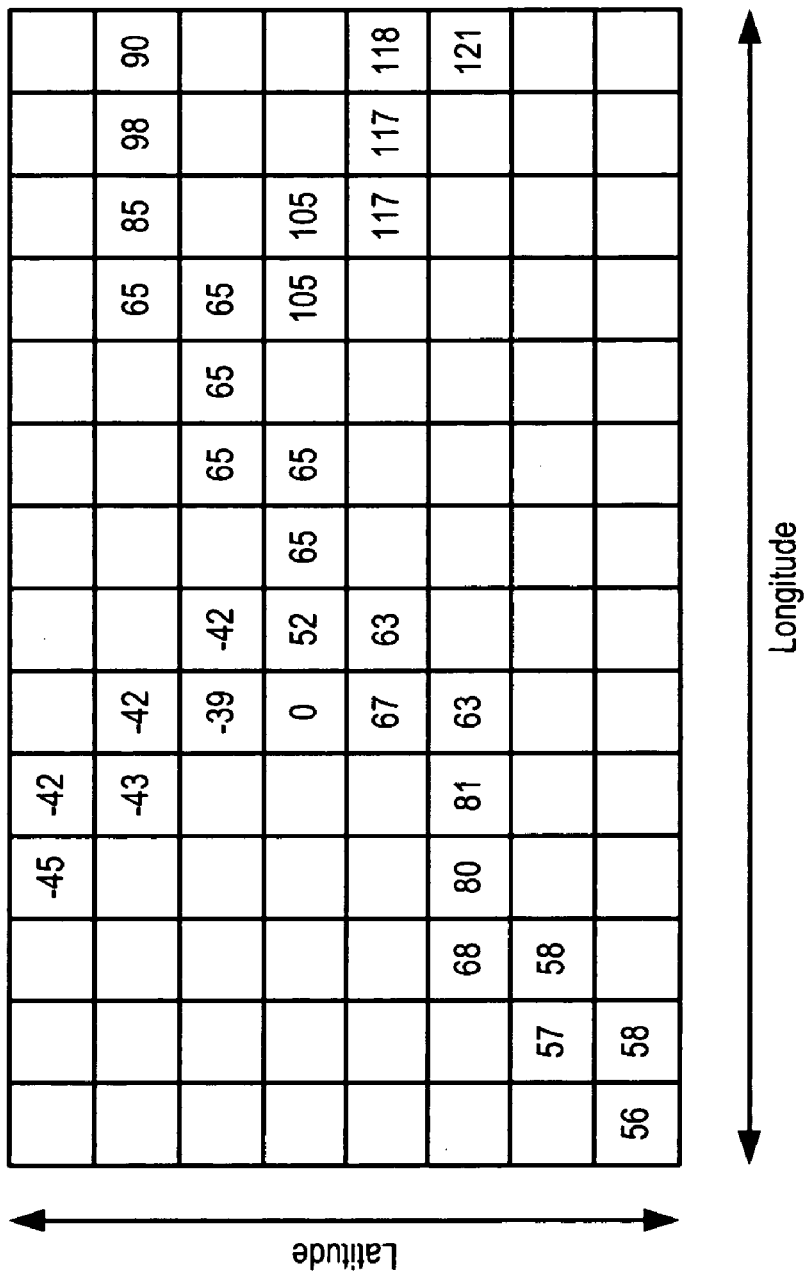
FIG. 7 depicts an illustrative road-orientation raster map in accordance with the illustrative embodiment of the present invention.

A convenient source of information for the road-orientation model is a raster map of road orientations, such as that shown in FIG. 7. Such a map contains geo-referenced raster points that have an orientation angle for in-road locations and no value in off-road locations. This map uses the cartography convention of orientation, reporting road angles in degrees with North being 0° and increasing angles moving in a clockwise direction.

Raster road-orientation maps typically are not available directly, but can be derived from vector road maps, or if a vector road map is not available, from a digital road map in conjunction with an intelligent tracer algorithm. Alternatively, raster road-orientation maps can even be derived by scanning a traditional paper-based road map, performing edge detection on the digital image, and computing slopes for the resulting image of the edge-detection algorithm. With all such information sources, it might be advantageous in some embodiments to "bleed" the road values several points beyond the true street boundaries in the map: this operation captures road effects for measurements (or maps) that have small offset errors in global positioning.

The effects of road-orientation on path loss can be modeled by the following equation:

$$\text{PathLoss} = r_{2k} \cos^{2k} \theta + \text{AdditionalPathLoss} \quad \text{(Eq. 23)}$$

where $r_{2k}$ is the maximum offset value in dB and $\theta$ is the angle between the base station bearing and the road orientation. The parameter k is an integer, typically from 2 to 5, that controls the range of angular contribution in the model. Higher values of k result in only a small range of values about $\theta=0°$ receiving any change in path loss due to road orientation.

Because the road-orientation effect on path loss is straightforward, the following simple formulation for matrix A and vector $\vec{x}$ is effective:

$$A = \begin{bmatrix} \cos^{2k} \theta_1 \\ \cos^{2k} \theta_2 \\ \vdots \\ \cos^{2k} \theta_N \end{bmatrix} \vec{x} = [r_{2k}] \quad \text{(Eq. 24)}$$

The value selected for $r_{2k}$ must be negative to be physically meaningful; in practice average values of $r_{2k}$ are typically between −1 dB and −3 dB, although various sites near wide, well-aligned highways can run as much as −10 dB.

Aggregate Propagation Models—This section describes how multiple matrix propagation models can be combined into a single aggregate model. In this manner, a very complicated propagation model may be constructed using information from a variety of disparate sources.

Given Q>1 propagation models with corresponding matrices 301 denoted $A_1, A_2, \ldots, A_Q$, and corresponding parameter vectors $\vec{x}$ denoted $\vec{x}_1, \vec{x}_2, \ldots, \vec{x}_Q$ that can be tuned against measurements, an aggregate model equation can be written as:

$$\vec{p} = A_1 \vec{x}_1 + A_2 \vec{x}_2 + \ldots + A_Q \vec{x}_Q \quad \text{(Eq. 25)}$$

Each model contributes a portion to the total path loss in $\vec{p}$. Equation 24 can be rewritten as the matrix equation:

$$\vec{p} = [A_1 | A_2 | \cdots | A_Q] \begin{bmatrix} \vec{x}_1 \\ \vec{x}_2 \\ \vec{x}_3 \\ \vdots \\ \vec{x}_Q \end{bmatrix} \quad \text{(Eq. 26)}$$

Thus, any number of arbitrary models can be aggregated in this fashion.

All of the rules for formatting, evaluation, and tuning described above for single models apply equally to aggregate models: the model can still be evaluated via a simple matrix multiplication, and the parameters can still be tuned (now jointly) via the normal equations. The individual smaller models that constitute the system are called model elements, and the collection of model elements into a large, single model matrix A is called the aggregate model.

Pre-Model—This section describes how a subset of model elements of an aggregate model can be tuned. Tuning a subset of model elements, referred to as pre-modeling, might be desirable in a variety of situations, such as when there is insufficient data for tuning particular model elements, or when one or more model elements have default parameters that already work well, or when one or more model elements would create an ill-conditioned aggregate model matrix that are ill-conditioned Rewriting Equation 26:

$$\vec{p} - \ldots - A_{Z+1} \vec{x}_{z+1} - \ldots - A_{Q-1} \vec{x}_{Q-1} - A_Q \vec{x}_Q = A_1 \vec{x}_1 + A_2 \vec{x}_2 + \ldots A_Z \vec{x}_Z \quad \text{(Eq. 27)}$$

In other words, the first z matrices (for some $1 \leq z \leq Q$) that remain on the left-hand side of Equation 27 contain the model elements that we desire to tune; the right-hand side contains the model elements that will remained untuned. It is assumed that, for the untuned model elements, accurate estimates of their parameters already exist.

Equation 27 can be rewritten in matrix form as $$\vec{p} - [A_{z+1} | \cdots | A_{Q-1} | A_Q] \begin{bmatrix} \vec{x}_{z+1} \\ \vec{x}_{z+2} \\ \vdots \\ \vec{x}_{Q-1} \\ \vec{x}_Q \end{bmatrix} = [A_1 | A_2 | \cdots | A_z] \begin{bmatrix} \vec{x}_1 \\ \vec{x}_2 \\ \vec{x}_3 \\ \vdots \\ \vec{x}_z \end{bmatrix} \quad \text{(Eq. 28)}$$

or more compactly as $$\vec{p} - A_{pm}\vec{x}_{pm} = A\vec{x} \quad \text{(Eq. 29)}$$

where $A_{pm}$ is an aggregate model matrix formed from the untuned model elements, and vector $\vec{x}_{pm}$ comprises the corresponding parameters of the premodel. Equation 29 is nearly the identical form of Equation 9 [$\vec{p} = A\vec{x}$], and thus we can apply the normal equations to Equation 29 for tuning, taking into consideration that $\vec{p}$ values on the right-hand side have been adjusted by the premodel component.

Default Parameters—This section describes how the aggregate model equation can be modified to include default parameters, which is particularly useful when there is a paucity of data available for tuning. The default parameter values are stored in a vector $\vec{x}_0$ and incorporated into the aggregate model as shown in Equation 30:

$$\begin{bmatrix} \vec{x}_0 \\ \vec{p} \end{bmatrix} - \begin{bmatrix} \vec{0} \\ A_{pm}\vec{x}_{pm} \end{bmatrix} = \begin{bmatrix} I_0 \\ A \end{bmatrix} \vec{x} \quad \text{(Eq. 30)}$$

where $I_0$ is an L by L identity matrix, $\vec{0}$ is an L-element zero vector, and L is the number of parameters in $\vec{x}$. The system of Equation 30 is then ready for tuning via the normal equations.

The addition of default parameters $\vec{x}_0$ introduces some useful behavior into the system. If there are no measurements available ($\vec{p}$ is empty), then the tuning operation will still produce a valid result: $\vec{x} = \vec{x}_0$. As measurements are added to the system, $\vec{x}$ slowly departs from its default values in $\vec{x}_0$ and begins to gravitate towards its optimal empirical values.

Parameter and Measurement Weighting—This section describes how the model elements of an aggregate model can be weighted non-uniformally. A weighted aggregate model takes the following format:

$$W \begin{bmatrix} \vec{x}_0 \\ \vec{p} \end{bmatrix} - W \begin{bmatrix} \vec{0} \\ A_{pm}\vec{x}_{pm} \end{bmatrix} = W \begin{bmatrix} I_0 \\ A \end{bmatrix} \vec{x} \quad \text{(Eq. 31)}$$

where W is a weighting matrix of the following form:

$$W = \begin{bmatrix} d_1 & 0 & 0 & \cdots & 0 & 0 & 0 & \cdots & 0 \\ 0 & d_2 & 0 & \cdots & 0 & 0 & 0 & \cdots & 0 \\ 0 & 0 & d_3 & \cdots & 0 & 0 & 0 & \cdots & 0 \\ \vdots & \vdots & \vdots & \ddots & \vdots & \vdots & \vdots & \ddots & \vdots \\ 0 & 0 & 0 & \cdots & w_1 & 0 & 0 & \cdots & 0 \\ 0 & 0 & 0 & \cdots & 0 & w_2 & 0 & \cdots & 0 \\ 0 & 0 & 0 & \cdots & 0 & 0 & w_3 & \cdots & 0 \\ \vdots & \vdots & \vdots & \ddots & \vdots & \vdots & \vdots & \ddots & \vdots \\ 0 & 0 & 0 & \cdots & 0 & 0 & 0 & \cdots & w_N \end{bmatrix} \quad \text{(Eq. 32)}$$

The values $d_1, d_2, d_3$, etc. are the default weights for tunable parameters. Higher weights force a parameter to stay closer to its default value during a tuning operation. The values $w_1, w_2, w_3, \ldots, w_N$ are the weights for each individual measurement. Increasing the weight makes its corresponding measurement point count more in the tuning process; this might be desirable for path-loss measurements that are deemed more reliable than others.

Figure 4:
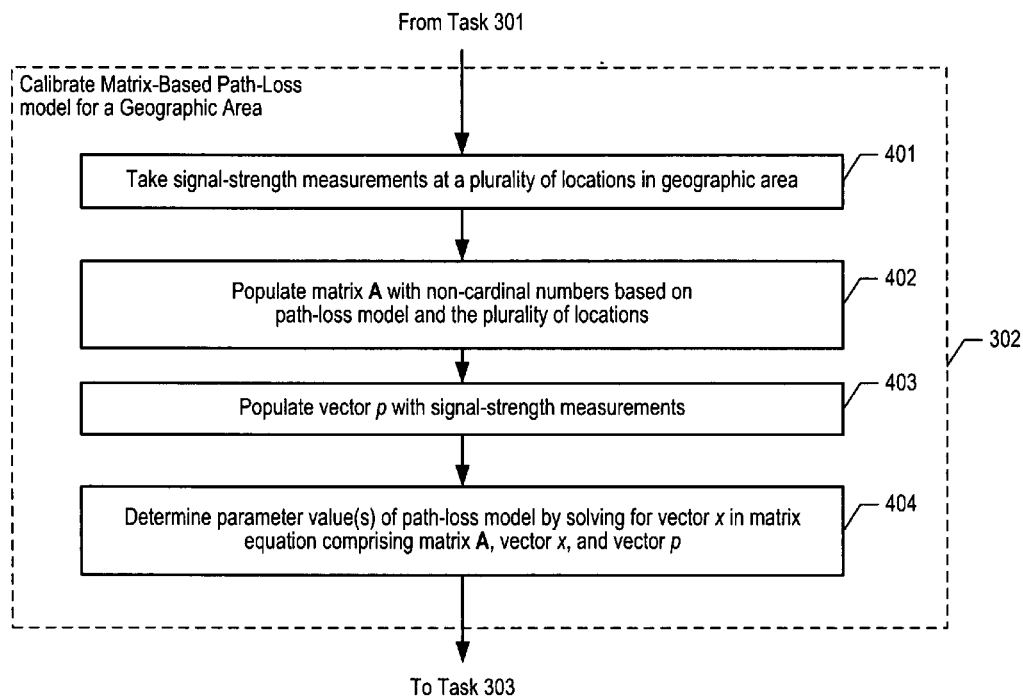
FIG. 4 depicts a detailed flowchart of task 302, as shown in FIG. 3, in accordance with the illustrative embodiment of the present invention.

FIG. 4 depicts a flowchart of the salient subtasks associated with task 302 in accordance with the illustrative embodiment of the present invention.

At task 401, signal-strength measurements are taken at a plurality of locations in the geographic area of interest, in well-known fashion.

At task 402, matrix A is populated with non-cardinal numbers based on the path-loss model and on the locations at which measurements were taken at task 401.

At task 403, vector $\vec{p}$ is populated with the signal-strength measurements of task 401.

At task 404, one or more parameter values of the propagation model are determined by solving Equation 13 for parameter vector $\vec{x}$ with matrix A and vector $\vec{p}$ as populated in tasks 520 and 530, respectively. As is well-known to those skilled in the art, there are many ways to solve matrix equations.

After task 404, task 302 is complete and execution continues at task 303 of FIG. 3.

Figure 5:
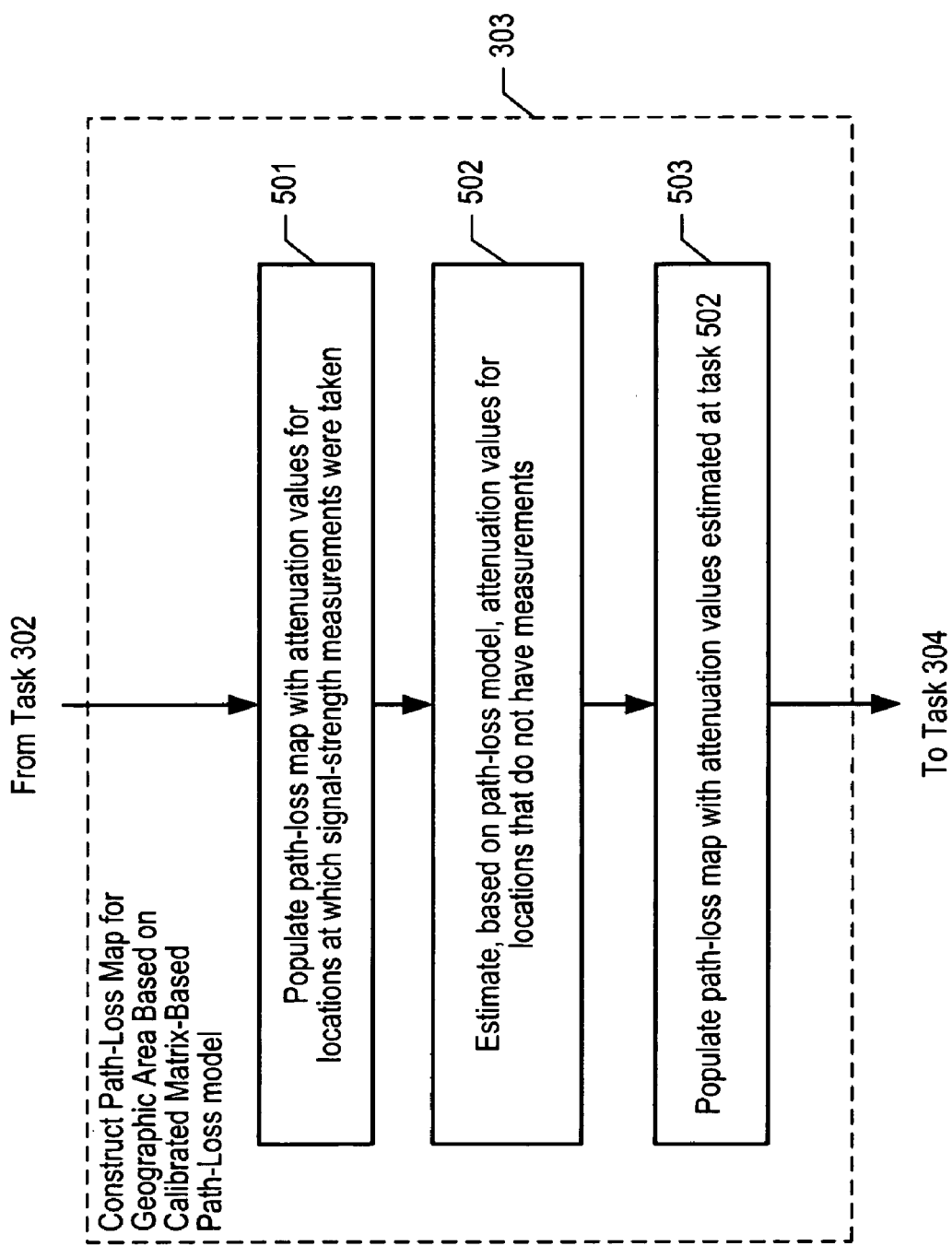
FIG. 5 depicts a detailed flowchart of task 303, as shown in FIG. 3, in accordance with the illustrative embodiment of the present invention.

FIG. 5 depicts a flowchart of the salient subtasks associated with task 303 in accordance with the illustrative embodiment of the present invention.

At task 501, an empty path-loss map is populated with attenuation values for the locations at which signal-strength measurements were taken at task 401 of FIG. 4.

At task 502, attenuation values for locations that do not have signal-strength measurements are estimated using the path-loss model, in well-known fashion.

At task 503, the path-loss map is populated with the attenuation values estimated at task 502.

After task 503, task 303 is complete and execution continues at task 304 of FIG. 3.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   (a) receiving a signal-strength measurement for a signal that traverses a path between a first radio and a second radio;
   (b) generating an estimate of the location of said first radio, wherein said estimate of the location of said first radio is based on:
      (i) said signal-strength measurement, and
      (ii) a path-loss map that is indicative of the path loss between the location of said second radio and a non-empty set S of locations;
   wherein said path-loss map is based on a path-loss model that estimates the effects of azimuth orientation on path loss; and
   wherein said path-loss model is based on a matrix that has N rows and L columns; and
   wherein N and L are positive integers; and
   wherein said path-loss map comprises measurements at N locations $\{\lambda_1, \lambda_2, \ldots, \lambda_N\} \subset S$; and
   wherein for all $i \in \{1, \ldots, N\}$ and $j \in \{1, \ldots, L\}$ the element of said matrix at row i and column j equals $\cos(j \cdot \theta_i)$, wherein $\theta_i$ is the bearing angle of location $\lambda_i$ with respect to the boresight of said second radio.

2. A method comprising:
   (a) receiving a signal-strength measurement for a signal that traverses a path between a first radio and a second radio;
   (b) generating an estimate of the location of said first radio, wherein said estimate of the location of said first radio is based on:
      (i) said signal-strength measurement, and
      (ii) a path-loss map that is indicative of the path loss between the location of said second radio and a non-empty set S of locations;
   wherein said path-loss map is based on a path-loss model that estimates one or more effects of transmitter antenna height on path loss; and
   wherein said path-loss model is based on a matrix that has N rows and L columns; and
   wherein N and L are positive integers; and
   wherein said path-loss map comprises measurements at N locations $\{\lambda_1, \lambda_2, \ldots, \lambda_N\} \subset S$; and
   wherein for all $i \in \{1, \ldots, N\}$ and $j \in \{1, \ldots, L\}$ the element of said matrix at row i and column j equals $h_i^j$, wherein $h_i$ is the height of said second radio's antenna with respect to location $\lambda_i$.

3. A method comprising:
   (a) receiving a signal-strength measurement for a signal that traverses a path between a first radio and a second radio;
   (b) generating an estimate of the location of said first radio, wherein said estimate of the location of said first radio is based on:
      (i) said signal-strength measurement, and
      (ii) a path-loss map that is indicative of the path loss between the location of said second radio and a non-empty set S of locations;
   wherein said path-loss map is based on a path-loss model that estimates the effects of terrain elevation on path loss; and
   wherein said path-loss model is based on a matrix that has N rows and L columns; and
   wherein N and L are positive integers; and
   wherein said path-loss map comprises measurements at N locations $\{\lambda_1, \lambda_2, \ldots, \lambda_N\} \subset S$; and
   wherein for all $i \in \{1, \ldots, N\}$ and $j \in \{1, \ldots, L\}$ the element of said matrix at row i and column j equals $t_i^j$, wherein $t_i$ is the difference in elevation between said second radio and location $\lambda_i$.

4. method comprising:
   (a) receiving a signal-strength measurement for a signal that traverses a path between a first radio and a second radio;
   (b) generating an estimate of the location of said first radio, wherein said estimate of the location of said first radio is based on:
      (i) said signal-strength measurement, and
      (ii) a path-loss map that is indicative of the path loss between the location of said second radio and a non-empty set S of locations;
   wherein said path-loss map is based on a path-loss model that estimates the effects of clutter on path loss; and
   wherein said path-loss model is based on a matrix that has N rows and L columns; and
   wherein said matrix has N rows and L columns; and
   wherein N is a positive integer; and
   wherein L is a positive integer greater than 1; and
   wherein columns 2 through L of said matrix correspond to L-1 clutter types; and
   wherein said matrix consists of ones and zeroes; and
   wherein the first column of said matrix consists of all ones; and
   wherein each row of said matrix has at most two ones; and
   wherein said path-loss map comprises measurements at N locations $\{\lambda_1, \lambda_2, \ldots, \lambda_N\} \subset S$; and
   wherein for all $i \in \{1, \ldots, N\}$ and $j \in \{1, \ldots, L\}$ the element of said matrix at row i and column j equals $t_i^j$, wherein $t_i$ is the difference in elevation between said second radio and location $\lambda_i$.

5. A method comprising:
   (a) receiving a signal-strength measurement for a signal that traverses a path between a first radio and a second radio;
   (b) generating an estimate of the location of said first radio, wherein said estimate of the location of said first radio is based on:
      (i) said signal-strength measurement, and
      (ii) a path-loss map that is indicative of the path loss between the location of said second radio and a non-empty set S of locations;
   wherein said path-loss map is based on a path-loss model that estimates the effects of pathway orientation on path loss; and
   wherein said path-loss model is based on a matrix that has N rows and 1 column; and
   wherein N is a positive integer; and
   wherein said path-loss map comprises measurements at N locations $\{\lambda_1, \lambda_2, \ldots, \lambda_N\} \subset S$; and
   wherein for all $i \in \{1, \ldots, N\}$ the element of said matrix at row i equals $\cos^{2k} \theta_i$, wherein $\theta_i$ is the angle between
      (i) the line connecting said second radio and location $\lambda_i$, and
      (ii) a tangent of a pathway at location $\lambda_i$.

6. A method comprising generating an estimate of the path loss between a first radio and a second radio;
   wherein said estimate is based on a path-loss model; and
   wherein at least one parameter value for said path-loss model is based on the solution of a matrix equation that comprises
(i) a matrix, and
(ii) a vector of N signal-strength measurements; and
wherein each of said signal-strength measurements is for a signal that traverses a path between said second radio and a respective one of N locations $\{\lambda_1, \lambda_2, \ldots, \lambda_N\}$; and
wherein N is a positive integer,
wherein said path-loss model estimates the effects of azimuth orientation on path loss; and
wherein said matrix has N rows and L columns; and
wherein L is a positive integer; and
wherein for all $i \in \{1, \ldots, N\}$ and $j \in \{1, \ldots, L\}$ the element of said matrix at row i and column j equals $\cos(j \cdot \theta_i)$, wherein $\theta_i$ is the bearing angle of location $\lambda_i$ with respect to the boresight of said second radio.

7. The method of claim 6 wherein said path-loss model estimates one or more effects of transmitter antenna height on path loss; and
wherein said matrix has N rows and L columns; and
wherein L is a positive integer; and
wherein for all $i \in \{1, \ldots, N\}$ and $j \in \{1, \ldots, L\}$ the element of said matrix at row i and column j equals $h_i^j$, wherein $h_i$ is the height of said second radio's antenna with respect to location $\lambda_i$.

8. The method of claim 6 wherein said path-loss model estimates the effects of terrain elevation on path loss; and
wherein said matrix has N rows and L columns; and
wherein L is a positive integer; and
wherein for all $i \in \{1, \ldots, N\}$ and $j \in \{1, \ldots, L\}$ the element of said matrix at row i and column j equals $t_i^j$, wherein $t_i$ is the difference in elevation between said second radio and location $\lambda_i$.

9. The method of claim 6 wherein said path-loss model estimates the effects of clutter on path loss; and
wherein said matrix has N rows and L columns; and
wherein L is a positive integer greater than 1; and
wherein columns 2 through L of said matrix correspond to L-1 clutter types; and
wherein said matrix consists of ones and zeroes; and
wherein the first column of said matrix consists of all ones; and
wherein each row of said matrix has at most two ones; and
wherein for all $i \in \{1, \ldots, N\}$ and $j \in \{2, \ldots, L\}$ a one at the ith row and jth column of said matrix indicates the presence of clutter type j-1 along the path between said second radio and location $\lambda_i$.

10. The method of claim 6 wherein said path-loss model estimates the effects of pathway orientation on path loss; and
wherein said matrix has N rows and 1 column; and
wherein for all $i \in \{1, \ldots, N\}$ the element of said matrix at row i equals $\cos^{2k} \theta_i$, wherein $\theta_i$ is the angle between
(i) the line connecting said second radio and location $\lambda_i$, and
(ii) a tangent of a pathway at location $\lambda_i$.

11. A method comprising:
(a) receiving a signal-strength measurement for a signal that traverses a path between a first radio and a second radio;
(b) generating an estimate of the location of said first radio, wherein said estimate of the location of said first radio is based on:
(i) said signal-strength measurement, and
(ii) a path-loss map that is indicative of the path loss between the location of said second radio and a non-empty set S of locations;
wherein said path-loss map is based on an aggregate path-loss model that comprises a first path-loss model and a second path-loss model; and
wherein said first path-loss model is based on a first matrix; and
wherein said second path-loss model is based on a second matrix; and
wherein at least one parameter value for said aggregate path-loss model is based on the solution of a matrix equation that comprises
(i) an aggregate matrix comprising said first matrix and said second matrix, and
(ii) a vector of signal-strength measurements for signals that traverse a path between said second radio and each of a plurality of locations.

12. The method of claim 11 wherein said matrix equation also comprises (iii) a matrix of weights for said signal-strength measurements.

13. The method of claim 12 wherein at least one of said weights is a default value associated with a tunable parameter of said first path-loss model.

14. A method comprising generating an estimate of the path loss between a first radio and a second radio;
wherein said estimate is based on an aggregate path-loss model that comprises a first path-loss model and a second path-loss model; and
wherein said first path-loss model is based on a first matrix; and
wherein said second path-loss model is based on a second matrix; and
wherein at least one parameter value for said aggregate path-loss model is based on the solution of a matrix equation that comprises
(i) an aggregate matrix comprising said first matrix and said second matrix, and
(ii) a vector of signal-strength measurements for signals that traverse a path between said second radio and each of a plurality of locations.

15. The method of claim 14 wherein said matrix equation also comprises (iii) a matrix of weights for said signal-strength measurements.

* * * * *